US012706850B2

(12) United States Patent
Kuruvilla et al.

(10) Patent No.: US 12,706,850 B2
(45) Date of Patent: Aug. 11, 2026

(54) SYSTEM AND METHOD FOR CLASSIFYING TRAFFIC FLOWS USING LANGUAGE PROCESSING

(71) Applicant: Sandvine Corporation, Waterloo (CA)

(72) Inventors: Ousef Kuruvilla, Bangalore (IN); Jujare Vinayaka, Bangalore (IN)

( * ) Notice: Subject to any disclaimer, the term of this patent is extended or adjusted under 35 U.S.C. 154(b) by 0 days.

(21) Appl. No.: 18/455,019

(22) Filed: Aug. 24, 2023

(65) Prior Publication Data

US 2024/0073149 A1 Feb. 29, 2024

(30) Foreign Application Priority Data

Aug. 24, 2022 (IN) ............................ 202211048290
Aug. 23, 2023 (EP) .................................... 23192832

(51) Int. Cl.
*H04L 47/2483* (2022.01)
*H04L 47/2475* (2022.01)
*H04L 61/4552* (2022.01)

(52) U.S. Cl.
CPC ...... *H04L 47/2483* (2013.01); *H04L 47/2475* (2013.01); *H04L 61/4552* (2022.05)

(58) Field of Classification Search
CPC ............. H04L 47/2483; H04L 47/2475; H04L 61/4552; G06F 16/285; G06F 16/355; G06F 16/951; G06F 16/24568
See application file for complete search history.

(56) References Cited

U.S. PATENT DOCUMENTS

2007/0033264 A1* 2/2007 Edge .................. H04L 61/4511 709/217
2007/0297417 A1* 12/2007 Cohen ..................... H04L 45/04 370/428
2012/0281536 A1* 11/2012 Gell ...................... H04W 28/06 370/235
2012/0327778 A1* 12/2012 Stanwood ........... H04L 47/2475 370/329
2016/0029176 A1* 1/2016 Marti ..................... H04W 4/18 455/456.3
2020/0202181 A1* 6/2020 Yadav ..................... G06F 16/35

(Continued)

FOREIGN PATENT DOCUMENTS

CN 104750754 A * 7/2015

*Primary Examiner* — Abdulkader M Alriyashi
(74) *Attorney, Agent, or Firm* — Amarok IP Inc.; Neil W. Henderson

(57) ABSTRACT

A method and system for classifying traffic flows on a computer network, the method including: determining sender information associated with a traffic flow; determining WhoIs data associated with the sender information; determining online information associated with the WhoIs data or hostname; parsing the online information for keywords; and classifying the traffic flow based on the keywords or natural language description. The system including: a WhoIs module configured to determine sender information associated with a traffic flow and determine WhoIs data or hostname associated with the sender information; a search request and response module configured to determine online information associated with the WhoIs data; a language model configured to parse the online information for keywords; and a Service and Category recognizer configured to classify the traffic flow based on the keywords or natural language descriptions.

20 Claims, 8 Drawing Sheets

(56) References Cited

U.S. PATENT DOCUMENTS

| | | | | |
|---|---|---|---|---|
| 2020/0366717 | A1* | 11/2020 | Chaubey | H04L 63/20 |
| 2023/0018387 | A1* | 1/2023 | Kuksta | G06F 16/954 |
| 2023/0409900 | A1* | 12/2023 | Gurinaviciūtė | G06F 16/951 |

* cited by examiner

{ 'domain_name': ['NFLXVIDEO.NET', 'nflxvideo.net'],
'registrar': 'MarkMonitor, Inc.',
'whois_server': 'whois.markmonitor.com',
'referral_url': None,
'updated_date': datetime.datetime(2021, 8, 26, 16, 28, 24),
'creation_date': datetime.datetime(2011, 5, 25, 19, 47, 43),
'expiration_date': [datetime.datetime(2011, 5, 25, 19, 47, 43),
datetime.datetime(2023, 5, 25, 7, 0)],
'name_servers': ['DNS1.P09.NSONE.NET',
'DNS2.P09.NSONE.NET',
'DNS3.P09.NSONE.NET',
'DNS4.P09.NSONE.NET',
'PDNS154.ULTRADNS.BIZ',
'PDNS154.ULTRADNS.COM',
'PDNS154.ULTRADNS.NET',
'PDNS154.ULTRADNS.ORG',
'dns1.p09.nsome.net',
'dns1.p09.nsome.net',
'pdns154.ultradns.com',
'pdns154.ultradns.org',
'dns2.p09.nsome.net',
'pdns154.ultradns.biz',
'pdns154.ultradns.net',
'dns3.p09.nsome.net'],
'status': ['clientDeleteProhibited https://icann.org/epp#clientDeleteProhibited',
'clientTransferProhibited https://icann.org/epp#clientTransferProhibited',
'clientUpdateProhibited https://icann.org/epp#clientUpdateProhibited',
'clientUpdateProhibited (https://www.icann.org/epp#clientUpdateProhibited)',
'clientTransferProhibited (https://www.icann.org/epp#clientTransferProhibited)',
'clientDeleteProhibited (https://www.icann.org/epp#clientDeleteProhibited)',
'emails': ['abusecomplaints@markmonitor.com',
'nicadmin@netflix.com',
'whoisrequest@markmonitor.com'],
'dnssec': 'unsigned',
'name': 'Domain Administrator'
'org': 'Netflix, Inc.',
'address': '100 Winchester Circle,',
'city': 'Los Gatos',
'state': 'CA',
'zipcode': '95032',
country': 'US'}

Figure 5

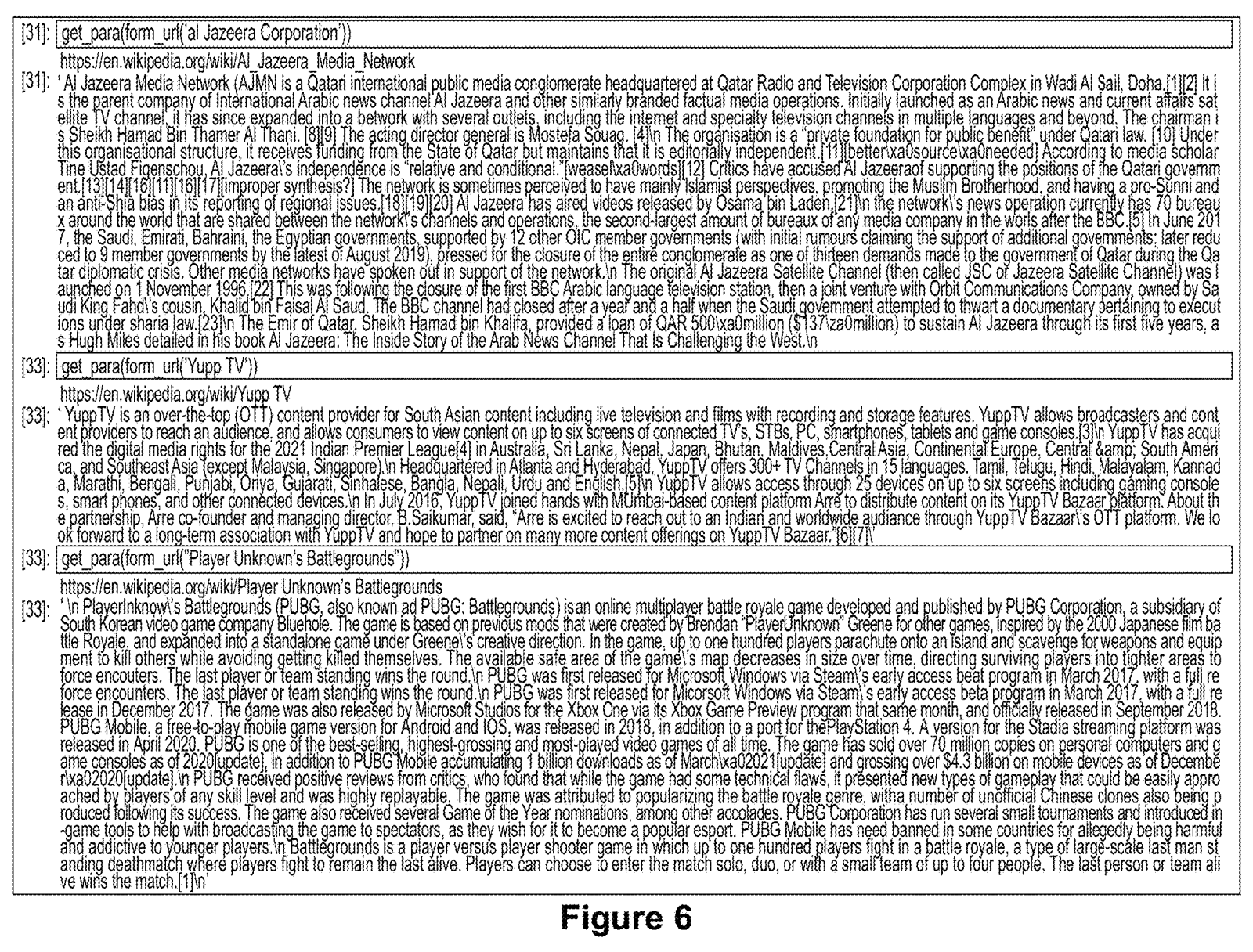

[31]: get_para(form_url('al Jazeera Corporation'))

https://en.wikipedia.org/wiki/Al_Jazeera_Media_Network

[31]: 'Al Jazeera Media Network (AJMN is a Qatari international public media conglomerate headquartered at Qatar Radio and Television Corporation Complex in Wadi Al Sail, Doha.[1][2] It is the parent company of International Arabic news channel Al Jazeera and other similarly branded factual media operations. Initially launched as an Arabic news and current affairs satellite TV channel, it has since expanded into a betwork with several outlets, including the internet and specialty television channels in multiple languages and beyond. The chairman is Sheikh Hamad Bin Thamer Al Thani. [8][9] The acting director general is Mostefa Souag. [4]\n The organisation is a "private foundation for public benefit" under Qatari law. [10] Under this organisational structure, it receives funding from the State of Qatar but maintains that it is editorially independent.[11][better\xa0source\xa0needed] According to media scholar Tine Ustad Figenschou, Al Jazeera\'s independence is "relative and conditional."[weasel\xa0words][12] Critics have accused Al Jazeeraof supporting the positions of the Qatari government.[13][14][16][11][16][17][improper synthesis?] The network is sometimes perceived to have mainly Islamist perspectives, promoting the Muslim Brotherhood, and having a pro-Sunni and an anti-Shia bias in its reporting of regional issues.[18][19][20] Al Jazeera has aired videos released by Osama bin Laden.[21]\n the network\'s news operation currently has 70 bureaux around the world that are shared between the network\'s channels and operations, the second-largest amount of bureaux of any media company in the worls after the BBC.[5] In June 2017, the Saudi, Emirati, Bahraini, the Egyptian governments, supported by 12 other OIC member governments (with initial rumours claiming the support of additional governments; later reduced to 9 member governments by the latest of August 2019), pressed for the closure of the entire conglomerate as one of thirteen demands made to the government of Qatar during the Qatar diplomatic crisis. Other media networks have spoken out in support of the network.\n The original Al Jazeera Satellite Channel (then called JSC or Jazeera Satellite Channel) was launched on 1 November 1996.[22] This was following the closure of the first BBC Arabic language television station, then a joint venture with Orbit Communications Company, owned by Saudi King Fahd\'s cousin, Khalid bin Faisal Al Saud. The BBC channel had closed after a year and a half when the Saudi government attempted to thwart a documentary pertaining to executions under sharia law.[23]\n The Emir of Qatar, Sheikh Hamad bin Khalifa, provided a loan of QAR 500\xa0million ($137\za0million) to sustain Al Jazeera through its first five years, as Hugh Miles detailed in his book Al Jazeera: The Inside Story of the Arab News Channel That Is Challenging the West.\n

[33]: get_para(form_url("Yupp TV"))

https://en.wikipedia.org/wiki/Yupp TV

[33]: ' YuppTV is an over-the-top (OTT) content provider for South Asian content including live television and films with recording and storage features. YuppTV allows broadcasters and content providers to reach an audience, and allows consumers to view content on up to six screens of connected TV's, STBs, PC, smartphones, tablets and game consoles.[3]\n YuppTV has acquired the digital media rights for the 2021 Indian Premier League[4] in Australia, Sri Lanka, Nepal, Japan, Bhutan, Maldives,Central Asia, Continental Europe, Central & South America, and Southeast Asia (except Malaysia, Singapore).\n Headquartered in Atlanta and Hyderabad, YuppTV offers 300+ TV Channels in 15 languages, Tamil, Telugu, Hindi, Malayalam, Kannada, Marathi, Bengali, Punjabi, Oriya, Gujarati, Sinhalese, Bangla, Nepali, Urdu and English.[5]\n YuppTV allows access through 25 devices on up to six screens including gaming consoles, smart phones, and other connected devices.\n In July 2016, YuppTV joined hands with MUmbai-based content platform Arré to distribute content on its YuppTV Bazaar platform. About the partnership, Arre co-founder and managing director, B.Saikumar, said, "Arre is excited to reach out to an Indian and worldwide audiance through YuppTV Bazaar\'s OTT platform. We look forward to a long-term association with YuppTV and hope to partner on many more content offerings on YuppTV Bazaar."[6][7]\'

[33]: get_para(form_url("Player Unknown's Battlegrounds"))

https://en.wikipedia.org/wiki/Player Unknown's Battlegrounds

[33]: '\n PlayerInknow\'s Battlegrounds (PUBG, also known ad PUBG: Battlegrounds) isan online multiplayer battle royale game developed and published by PUBG Corporation, a subsidiary of South Korean video game company Bluehole. The game is based on previous mods that were created by Brendan "PlayerUnknown" Greene for other games, inspired by the 2000 Japanese film Battle Royale, and expanded into a standalone game under Greene\'s creative direction. In the game, up to one hundred players parachute onto an island and scavenge for weapons and equipment to kill others while avoiding getting killed themselves. The available safe area of the game\'s map decreases in size over time, directing surviving players into tighter areas to force encouters. The last player or team standing wins the round.\n PUBG was first released for Microsoft Windows via Steam\'s early access beat program in March 2017, with a full reforce encounters. The last player or team standing wins the round.\n PUBG was first released for Micorsoft Windows via Steam\'s early access beta program in March 2017, with a full release in December 2017. The game was also released by Microsoft Studios for the Xbox One via its Xbox Game Preview program that same month, and officially released in September 2018. PUBG Mobile, a free-to-play mobile game version for Android and IOS, was released in 2018, in addition to a port for thePlayStation 4. A version for the Stadia streaming platform was released in April 2020. PUBG is one of the best-selling, highest-grossing and most-played video games of all time. The game has sold over 70 million copies on personal computers and game consoles as of 2020[update], in addition to PUBG Mobile accumulating 1 billion downloads as of March\xa02021[update] and grossing over $4.3 billion on mobile devices as of December\xa02020[update].\n PUBG received positive reviews from critics, who found that while the game had some technical flaws, it presented new types of gameplay that could be easily approached by players of any skill level and was highly replayable. The game was attributed to popularizing the battle royale genre, witha number of unofficial Chinese clones also being produced following its success. The game also received several Game of the Year nominations, among other accolades. PUBG Corporation has run several small tournaments and introduced in-game tools to help with broadcasting the game to spectators, as they wish for it to become a popular esport. PUBG Mobile has need banned in some countries for allegedly being harmful and addictive to younger players.\n Battlegrounds is a player versus player shooter game in which up to one hundred players fight in a battle royale, a type of large-scale last man standing deathmatch where players fight to remain the last alive. Players can choose to enter the match solo, duo, or with a small team of up to four people. The last person or team alive wins the match.[1]\n'

Figure 6

```
[<meta content="text/html; charset=utf-8" http-equiv="Content-Type"/>,
 <meta charset="utf-8"/>,
 <meta content="IE=edge" http-equiv="X-UA-Compatible"/>,
 <meta content="Aob+++752GiUzm1RNSIkM9TINnQDT1xz02v8hFJK/uGO2hmXnJqH8c/ZpI05b2nLsHDh
GO3Ce2zXJUFQm07jA4AAAB1eyJvcmlnaW4iOiJodHRwczovL25ldGZsaXguY29tOjQ0MyIsImZlYXR1cmUiOi
JFbmNyeXB0ZWRNZWRpYUhkT3BQb2xpY3lDaGVjayIsImV4cGlyeSI6MTU0MzQyNCwiaXNTdWJkb21haW4
iOnRydWV9" data-expires+"2018-11-26" data-features="EME Extension - Policy Check" http
-equiv="origin-trial"/>,
 <meta content="watch movies, movies online, watch TV, TV online, TV shows online,wa
tch TV shows, stream movies, stream tv, instant streaming, watch online, movies, watc
h movies India, watch TV online, no download, full length movies" name=keywords"/>,
 <meta content="Watch Netflix movies & TV shows online or stream right to your sm
art TV, game console, PC, Mac, mobile, tablet and more." name="description"/>,
 <meta content="width=device-width,initial-scale=1.0,minimum-scale=1.0,maximum-scale=
1.0" name="viewport"/>,
 <meta content="yes" name="apple-mobile-web-app-capable"/>,
 <meta content="black" name="apple-mobile-web-app-status-bar-style"/>,
 <meta content="telephone=no" name="format-detection"/>,
 <meta content="http://assets.nflxext.com/en_us/layout/ecweb/netflix-app-icon_152.jp
g" name="apple-touch-icon"/>,
 <meta content="Watch Netflix movies & TV shows online or stream right to your sm
art TV, game console, PC, Mac, mobile, tablet and more." property="og:description"/>,
 <meta content="nflx://www.netflix.com/?locale=en-IN" property="al:ios:url"/>,
 <meta content="363590051" property-"al:ios:app_store_id"/>,
 <meta content="Netflix" property=al:ios:app_name"/>,
 <meta content="nflx://www.netflix.com/?locale=en-IN" property="al:android:url"/>,
 <meta content="com.netflix.mediaclient" property="al:android:package"/>,
 <meta content="Netflix" property="al:android:app_name"/>,
 <meta content="player" name="twitter:card"/>,
 <meta content="@netflix" name="twitter:site"/>]
```

Figure 7

```
> Frame 483: 122 bytes on wire (976 bits), 122 bytes captured (976 bits)
> Ethernet II, scr: Dell_dc:68:fe (bc:30:5b:dc:68:fe), Dst: Dell_f2:b8:dc (f):4d:a2:f2:b8:dc)
> Internet Protocol Version 4, Src:172.31.1.12, Dst: 185.240.204.78
> Transmission Control Protocol, Scr Port: 22296, Dst Port: 57084, Seq:1, Ack: 2, Len: 68
˅ BitTorrent
    Protocol Name Length: 19
    Protocol Name: BitTorrent protocol
    Reserved Extension Bytes: 6578000000100001
    SHA1 Hash of info dictionary: 8b851cd45093b458da23ba0ed834906d79f4e2d7
    Peer ID: 2d4243303137352d00a555dc335d7cb5fd4053f6
```

```
0000  f0 4d a2 f2 b8 dc bc 30  5b dc 68 fe 08 00 45 00   ·M·····0 [·h···E·
0010  00 6c 13 c8 40 00 80 06  00 00 ac 1f 01 0c b9 f0   ·1··@··· ········
0020  cc 4e 57 18 de fc be 7f  44 53 9f 94 b9 aa 50 18   ·NW····· DS····P·
0030  04 00 33 c9 00 00 13 42  69 74 54 6f 72 72 65 6e   ·3·····B itTotten
0040  74 20 70 72 6f 74 6f 63  6f 6c 65 78 00 00 00 10   t protoc olex····
0050  00 01 8b 85 1c d4 50 92  b4 58 da 23 ba 0e d8 34   ·······P· ·X·#···4
0060  90 6d 79 f4 e2 d7 2d 42  43 30 31 37 35 2d 00 a5   ·my···B C0175-··
0070  55 dc 33 5d 7c b5 fd 40  53 f6                     U·3]l··@ S·
```

Figure 8

SYSTEM AND METHOD FOR CLASSIFYING TRAFFIC FLOWS USING LANGUAGE PROCESSING

RELATED APPLICATION

The present disclosure claims priority to Indian Patent Application No. 202211048290 filed Aug. 24, 2022 and European Patent Application No. 23192832.6 filed Aug. 23, 2023, which are hereby incorporated herein in their entirety.

FIELD

The present disclosure relates generally to handling of computer network traffic. More particularly, the present disclosure relates to a system and method for classifying network traffic flows using web search/scraping and language processing.

BACKGROUND

Encryption of network traffic continues to increase, making it more difficult to determine the type of network traffic within an operator's network. With encryption, identifying an application or type of traffic can be a challenge. Identifying as much traffic as possible to a category of traffic or an application can be important for taking any action or decision on the network traffic and determining that traffic is being charged at an appropriate rate to the subscriber. Traffic identification may be needed when various applications are being charged at different rates, if users are attempting to masquerade one category of traffic as another, or the like. Further with new providers of various services, for example video streaming and gaming, the source of the traffic may not always be recognized, creating more difficulty in classifying the traffic for various purposes such as shaping and the like.

If traffic cannot be properly classified, the network operator may be losing out on revenue and may not be able to make network upgrade decisions based on reliable data. As more and more information within the traffic flow is becoming encrypted, it becomes more difficult to classify traffic. Relying on previously known sources for various applications is not always feasible with new providers constantly beginning operation.

As such, there is a need for an improved system and method for classifying traffic flows in a computer network, for example, using web search/scraping and language techniques.

The above information is presented only to assist with an understanding of the present disclosure. No determination has been made, and no assertion is made, as to whether any of the above might be applicable as prior art with regard to the present disclosure.

SUMMARY

In a first aspect, there is provided a method for classifying traffic flows on a computer network, the method including: determining sender information associated with a traffic flow; determining WhoIs data associated with the sender information; determining online information associated with the WhoIs data or hostname; parsing the online information for keywords; and classifying the traffic flow based on the keywords or natural language description.

In some cases, parsing the online information may include: using a natural language model to determine a frequency of keywords associated with a category of application type.

In some cases, parsing the online information may include: using a natural language mode to infer the application type based on the keywords.

In some cases, the sender information may include at least one of IP Address, hostname or Server Name Indication (SNI).

In some cases, determining online information associated with the WhoIs data may include querying an online WhoIs database.

In some cases, determining online information associated with the WhoIs data may include: creating a URL with the WhoIs data or hostname; determining whether the created URL is an active online website; and determining online information from the website.

In some cases, determining online information associated with the WhoIs data may include: searching an online search provider with the WhoIs data; and determining online information from the search results.

In some cases, the traffic flow may be a torrent flow and the online information may be an info hash found with the traffic flow.

In another aspect, there is provided a system for classifying traffic flows on a computer network, the system including: a WhoIs module configured to determine sender information associated with a traffic flow and determine WhoIs data or hostname associated with the sender information; a search request and response module configured to determine online information associated with the WhoIs data; a language model configured to parse the online information for keywords; and a Service and Category recognizer configured to classify the traffic flow based on the keywords or natural language descriptions.

In some cases, the language model may parse the online information using a natural language model to determine a frequency of keywords associated with a category of application type.

In some cases, the language model may parse the online information using a natural language model to infer the application type based on the keywords or text from the online information.

In some cases, the sender information may include at least one of IP Address, hostname or Server Name Indication (SNI).

In some cases, the WhoIs module may be configured to query an online WhoIs database.

In some cases, the system may include a URL module configured to create a URL with the WhoIs data.

In some cases, the URL module may be further configured to: determine whether the created URL is an active online website; and determine online information from the website.

In some cases, the search request and response module may be configured to: search an online search provider with the WhoIs data or hostname; and determine online information from the search results.

In some cases, the system may further include a torrent module configured to determine an info hash found with the traffic flow, when the traffic flow is a torrent flow.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

FIG. 5 illustrates an example response obtained from a WHOIS database;

FIG. 6 illustrates an example of text sourced from Wikipedia;

FIG. 7 illustrates an Example Netflix HTLM response; and

FIG. 8 illustrates an info hash associated with a torrent flow as viewed in Wireshark.

DETAILED DESCRIPTION

Generally, the present disclosure provides a method and system for classifying traffic. The system is configured to retrieve or determine data associated with a sender, such as an application server or server hosting the application. Generally speaking, the term "sender" herein is intended to represent the entity sending the bulk of the data to a receiver, such as an end user that is requesting the data or the like, however, the system and method herein is not necessarily restricted in this way. The data may include the server IP or host name related to the traffic flow. The system and method detailed herein can perform lookups related to the owner of the Server IP or host name via, for example Whols platforms, web-scraping from URLs, and/or online searches. From the results, the system is configured to extract features such as key-phrases and frequency of occurrence from meta-data, plain text from descriptions or webpage, HTML code snippets etc. which can then be input to language model(s) to classify and categorize the traffic.

Figure 1:
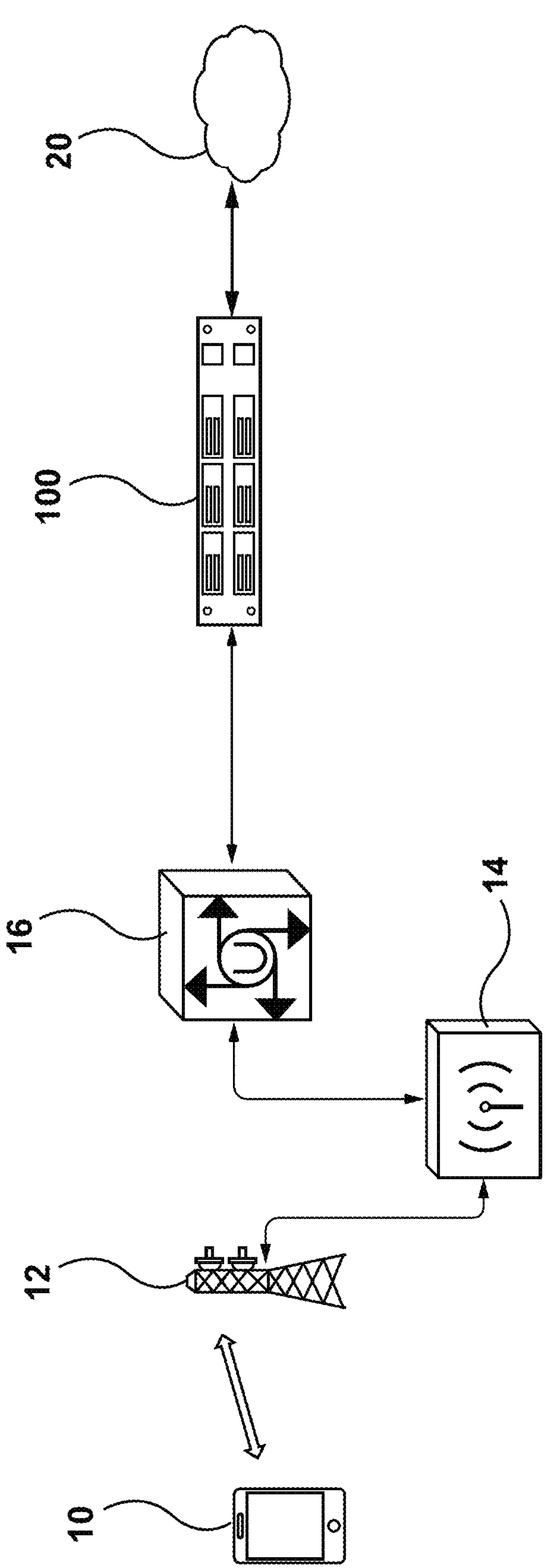
FIG. 1 illustrates an environment for computer network traffic over an operator network.

FIG. 1 illustrates an environment for an embodiment of the system. A subscriber, using a user device 10, may initiate a traffic flow with a base station 12. The traffic flow may be transmitted to and from a core network 14 from the base station. The traffic flow may be seen and directed by the operator network 16 and may be reviewed and classified by a system 100 for classifying traffic flows. The system 100 may be included as a component of a network device which resides between the operator's gateway and the Internet 20. The system 100 is intended to reside within the operator's or Internet Service Provider's (ISP's) network 16. It will be understood that embodiments of the system and method detailed herein are intended to be employed over any type of computer network, for example, fixed line, mobile, satellite or other network.

Embodiments of the system and method are intended to be able to classify traffic flows that may be encrypted but may still include one of the following:

- Server IP or hostname: In this case, the system is configured to attempt to classify the traffic by identifying application name or traffic category.
- Info-hash of torrent being downloaded: In this case, the system is configured to identify the content being downloaded or seeded by a subscriber.

Embodiments of the system and method noted herein are intended to use public databases to determine information regarding traffic flows. In particular, some embodiments may use, for example, a Whois API and/or database. The Whois database is a widely used Internet record listing that identifies who owns a particular domain. Given an IP address or hostname, a Whois API query will return the domain and the organization names that may be useful in classification of the traffic flows. In some cases, the Whois data may include a hostname associated with the domain.

Embodiments of the system and method are further intended to use language models in classifying traffic flows. Natural Language Processing (NLP) combines computational linguistics—rule-based modeling of text—with statistical, machine learning, and deep learning models. Together, these technologies are intended to enable computers to process text and to understand the text's meaning, complete with the writer's intent and sentiment.

Embodiments of the system and method are intended to apply different techniques of NLP to compute the Hypertext Markup Language (HTML) text and Uniform Resource Locator (URL) metadata and determine language models that will aid in identifying the category and/or application of the traffic with the help of the hostname/server IP.

In a specific example, Convolutional Neural Networks (CNN) may be used. Traditionally, CNNs are a type of neural network that can be used for image classification. But 1-Dimensional (1D) CNNs have been shown to be particularly useful for text classification. 1D CNNs may be adapted to use the HTML source as input to the model and provide an inference that can be one of several categories and sub classifications.

Network operators and ISPs are interested in identifying the characteristics of network traffic including, for example, the application name, category, torrent filenames and the like. In the cases of torrent files, it may be beneficial to determine whether the files being frequently uploaded or downloaded are legal and/or legitimate. With the rise in encryption, given the multitude of applications and the changing trends in popularity of applications, it has become difficult to classify services and traffic categories.

Embodiments of the system and method detailed herein are intended to classify unknown traffic that other methods have not been able to classify. The system and method detailed herein aim to classify this traffic in situations where HTML information from the server IP and/or name is available, or the Info hash of a torrent flow (seed or download) is known.

Embodiments of the system and method are intended to provide a solution to classify unknown traffic using just server IP, hostname or info-hash, which is information obtained from the network being monitored. A web-scraping bot is configured to attempt to obtain information about the unknown traffic from the public Internet with the objective of identifying application, traffic category (and related characteristics) and torrent information.

Conventional solutions rely on humans to identify the application name, traffic category or torrent filename, which can lead to error. Further, given the amount of network traffic exchanged over an operator's system, a human is unlikely to be able to review and classify the extent of unknown traffic, and such efforts would unlikely be able to classify traffic in real time. The present solution provides for an automated end to end process, which also includes using Language models (Deep learning techniques) to simulate human intelligence for understanding the textual data as a human would.

Figure 2:
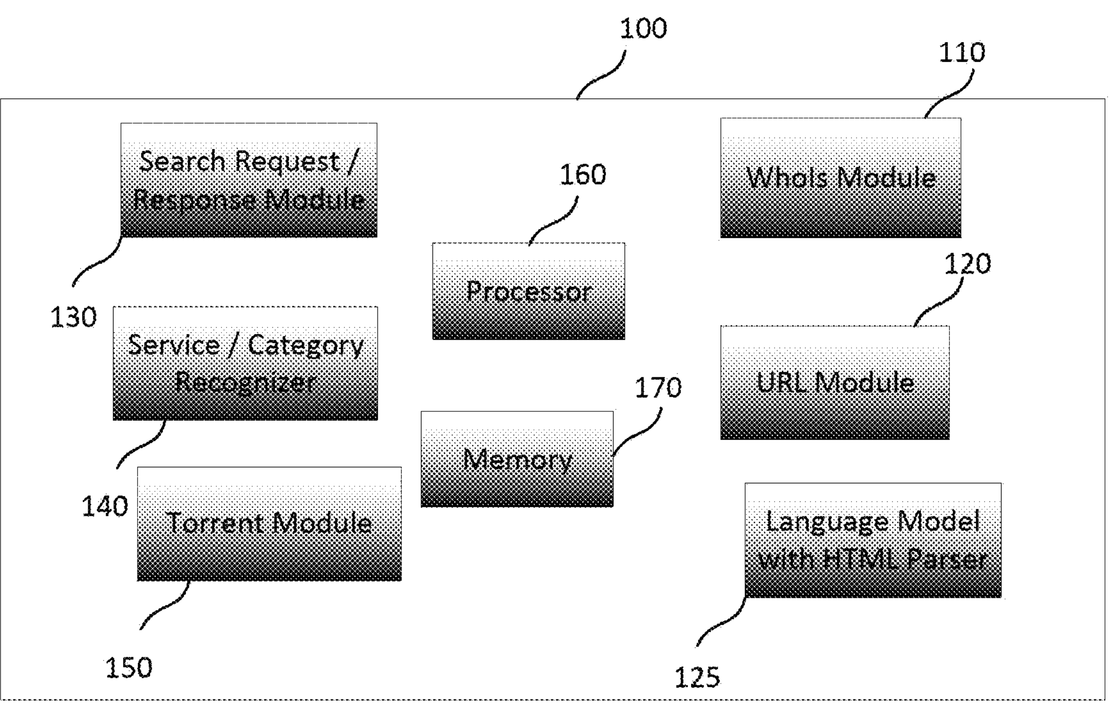
FIG. 2 illustrates an example embodiment of a system for classifying traffic according to an embodiment.

FIG. 2 illustrates a system for classifying traffic flows. The system includes a WhoIs Module 110, a URL module 120, a language model 125, a Search Request/Response module 130, a Service/Category Recognizer 140, a Torrent Module 150, at least one processor 160, and a memory component 170. The system is generally intended to be distributed and reside in at least one network device on the data plane. The processor may be configured to execute the instructions stored in the memory component in order for the modules to execute their functions. The system 100 is intended to receive information from the computer network equipment that allows the system to determine traffic flow statistics and provide for traffic action instructions and traffic management rules for the network.

The WhoIs Module 110 is configured to obtain information pertaining to a sender such as an application server of the traffic flow, for example an IP Address, hostname or Server Name Indication (SNI) associated with a traffic flow. The WhoIs Module is configured to query a WhoIs database and determine the owner, the domain name, the hostname, or the like. The WhoIs Module 110 may include a parser configured to extract the organization name or domain name or the owner of the IP address. The WhoIs module 110 may provide the organization name to the Service/Category Recognizer to map the organization to a known type of traffic flow in order to classify the traffic flow.

The URL Module is configured 120 create a URL with the hostname, domain name, or organization name in order to determine if there is a matching host or online website associated with the IP Address, hostname or SNI. By creating various URLs with different Top level domain endings, the URL module is configured to determine if the URLs are hosted and if there is an active website that provides keyword or meta-data to determine the type of service and category of the traffic flows. The URL Module 120 may provide text from any successful website search or scraping to the language model 125.

The language model 125 is configured to determine the class or application to which a flow belongs, for example a website, search results, or the like, that can be used to classify and categorize a traffic flow. The language model 125 includes an HTML parser that may be configured to determine frequencies of keywords that can imply or can be used to infer an associated service or category of the traffic as one approach. The language module may further employ natural language recognition to review the text in order to use the text to classify the traffic flow to an appropriate application and/or category as detailed herein.

The Search Request/Response module 130 is configured to provide for an online search with respect to the hostname or organization name. The search may be done from an online search provider, for example, Google™ Bing™ of the like, or from an online information source, for example Wikipedia™ or the like. This search may be done in conjunction with a URL request or may be done if the URL request fails to match an appropriate URL. The text from the search results may be provided to the HTML parser or the language model 125. The language model 125 may provide a classification or categorization using one or more of several approaches, for example, key-phrase matching, deep learning, or the like.

The Service/Category Recognizer 140 is intended to map the keywords to a type of traffic category or classification or provide a classification based on matching or other natural language processing provided by the language model 125. The Service/Category Recognizer 140 may include a mapping table or database wherein previous words and frequencies have been mapped such that new services and categories can be determined based on the previous mapping. In some cases, the Service/Category Recognizer may also provide for traffic actions once the traffic flow has been classified. In other cases, other network devices may provide for the traffic action once the service/category recognizer 140 has mapped and classified the traffic. This may be achieved by beginning the download in a torrent client until the file information is downloaded and then stopping the download.

The Torrent Module 150 is configured to review and determine data with respect to torrents and peer to peer traffic. In some cases, knowing the type of torrent is intended to provide data with respect to the legitimacy of the torrent. The torrent module 150 is configured to obtain the info hash of torrents being downloaded by subscribers. This info hash is used to obtain the Title and Description of the torrent files from an online reverse lookup, for example a third party lookup, or by downloading the torrent partially to obtain the desired information.

Figure 3:
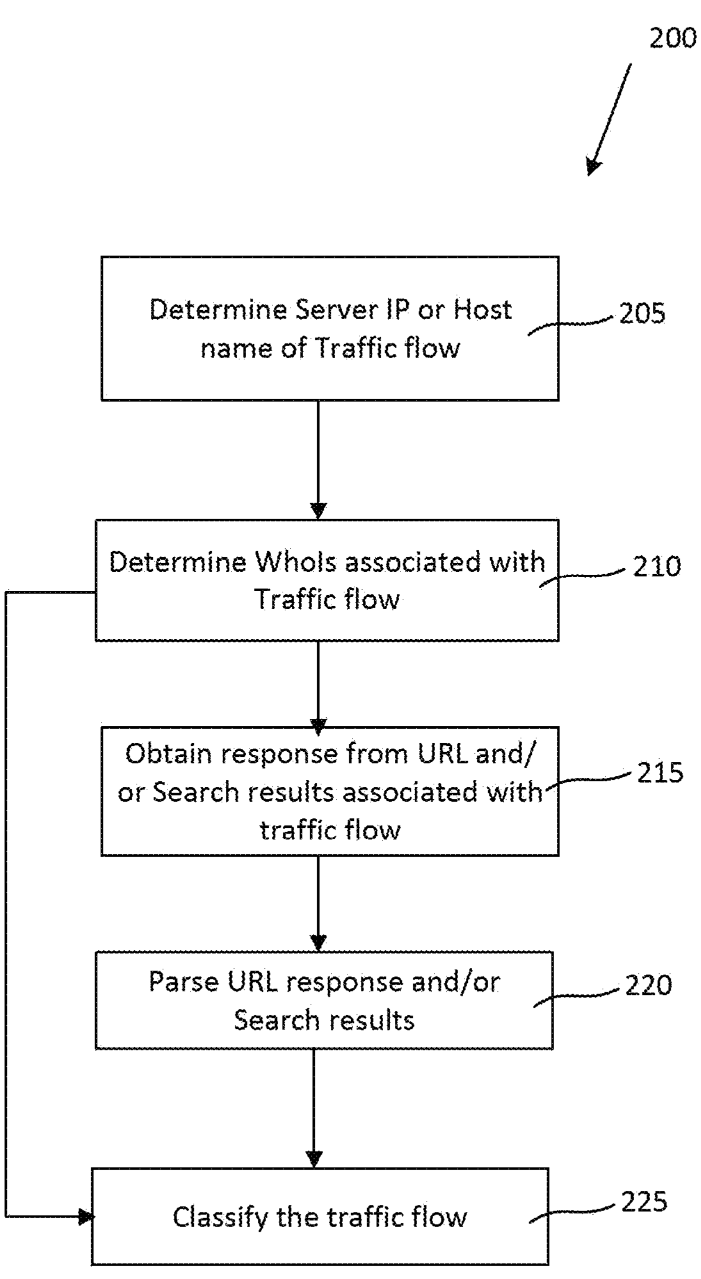
FIG. 3 illustrates an embodiment of a method for classifying traffic.
Figure 4:
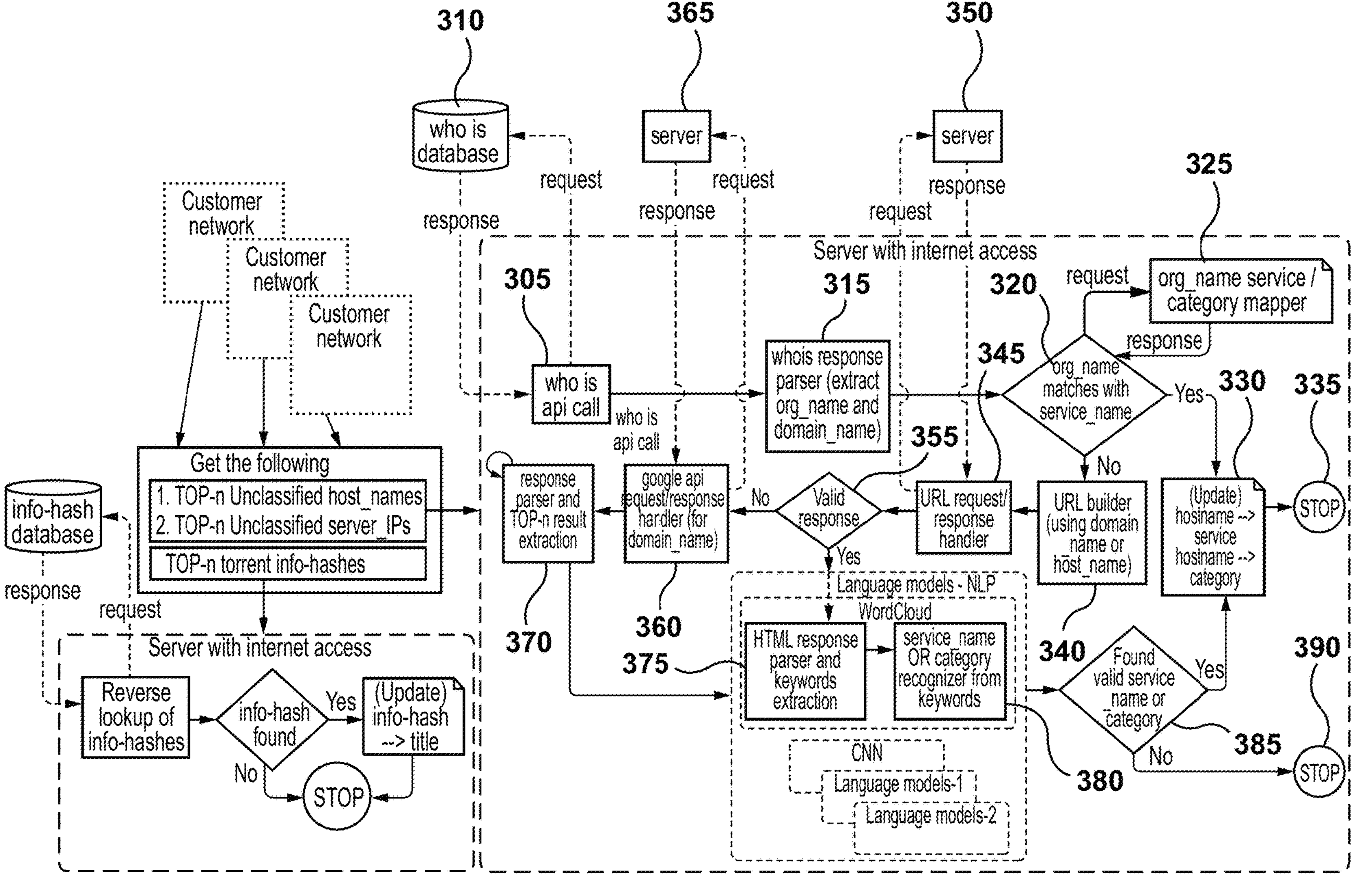
FIG. 4 illustrates a data flow of the traffic through the system for the method of classifying traffic.

FIG. 3 illustrates a high-level flow chart of a method 200 for classifying traffic flows according to an embodiment. At 205, the WhoIs Module 110 is configured to receive Server IP or Hostname associated with the traffic flow. The WhoIs Module 110 is configured to query or otherwise determine the associated WhoIs information that would be connected with the Server IP or Hostname, at 210. If the server IP or Hostname owner matches a previously mapped correlation, the traffic flow may be categorized and classified, at 255.

At 215, if there is no match on the WhoIs association, the URL module may obtain responses from various URLs that include the Server IP and/or hostname and/or organization name retrieved from the WhoIs information. The search request and response module may also search online information sources as well as use online search providers to determine more information related to the Server IP and/or hostname. At 220, the language model reviews the results, and the HTML parser may parse the URL responses and/or search results that are associated with the server IP and hostname. The language model 125 may also provide classification mapping indicia, for example, frequency results to key words, or the like. These mapping indicia are intended to provide indications as to the type of traffic. With these results, the Service and Category Recognizer is intended to map the traffic flow to a traffic service or category to classify the traffic at 225.

FIG. 5 illustrates a method for classifying a received traffic flow according to an embodiment. The input to the system is intended to be one of the following: Server IP, SNI, or Host name or Torrent info-hash. This information is generally available in the network as at the very least ISPs will have access to the server IPs that any of their subscribers are accessing.

The method is intended to proceed similarly in the situation where the system receives either a server-IP or a hostname and will be detailed together. The method using a torrent info-hash requires other considerations and is detailed in a second example.

With the server-IP, SNI, or hostname, the Whois Module is configured to perform a Whois API call at 305. The API call is intended to lookup the server IP or in a Whois database, at 310. This is a publicly available database that can be accessed by the system or maintained online or by a third party. In general, the Whois is maintained by the five regional internet registries and obtains data directly from the domain registrars:

1. The African Network Information Center (AFRINIC) serves Africa.
2. The American Registry for Internet Numbers (ARIN) serves Antarctica, Canada, parts of the Caribbean, and the United States.
3. The Asia-Pacific Network Information Centre (APNIC) serves East Asia, Oceania, South Asia, and Southeast Asia.
4. The Latin America and Caribbean Network Information Centre (LACNIC) serves most of the Caribbean and all of Latin America.
5. The Réseaux IP Européens Network Coordination Centre (RIPE NCC) serves Europe, Central Asia, Russia, and West Asia.

The response obtained from the Whois database is sent to the Whois parser as part of the Whois module, at 315. An example Whois response for a certain IP address is shown in FIG. 5. From the example response obtained and shown in FIG. 5, the Whois module is configured to determine the domain name and the organization name. The system is configured to parse the response to obtain these elements using the Whois Response Parser module.

From the Whois response, the Whois module is configured to parse the text so as to obtain the domain name and/or organization name of the server IP/hostname. The organization mapper is configured to attempt to match the organization to a known application, at 320. This mapper may be manually and periodically updated with known services. Application to domain mapping that is available can be used for classifying other flows that belong to the same domain that may be otherwise unclassified. In the example shown in FIG. 5, the organization name is shown as 'Netflix Inc.'. The mapper would determine at this stage that the traffic flow is associated with an entry for the Netflix application, at 325. This mapping is maintained within the system and is periodically updated as and when new matches are discovered by the system. When the domain name and/or organization name matches a known service, the traffic flow can be automatically updated in the mapper. Other cases may require further additions that may be done manually or by extracting information from known signatures that are used to classify applications. The system, if a match is found may consider a valid match is found which may allow the service/category recognizer to update the classification of the traffic flow at 330. The method may end after this classification at 335.

In the event that a valid match is found, the server-IP or hostname is then mapped to a given application/category and the traffic flow is considered classified.

If a valid match could not be found, the URL module may then proceed to execute various other modules of a web scraper bot as described below using the domain name and/or the hostname directly, at 340.

From the domain name or hostname, the URL module is configured to build a possibly working URL. This involves adding extensions to the domain name or host name as may be needed in some cases. Multiple URLs may be created and each one is sent a request, at 345 so as to obtain a response from a server at 350.

The URL module is configured to create and send a request to the URLs created using the domain name and/or hostname. In the event that a valid response is received, the response is sent to the HTML response parser, which feeds into the language models as part of the language module 125, at 355.

If a valid response was not obtained, the formed URLs are sent to the Search request and response module, at 360. The Search request and response module is configured to search a search engine, for example Google, and obtain an HTML response from the search results at 370. The search response is then sent to the HTML response parser.

This module will automatically search a search engine or other information sources, for example, Google™, Wikipedia™ or the like for any text information related to the domain name. HTML responses of the first or first few search results or text from information sources are sent to the natural language parser or the system, at 375, to obtain and match with relevant keywords that allow identification of the target categories for the search term. FIG. 6 provides an example of text sourced from Wikipedia.

The HTML parser module is configured to parse the HTML response. The HTML parser module may first identify the meta-data related to Keywords and Description and determine a frequency of occurrence of several preconceived keywords or language models. In some cases, the HTML may also parse the HTML code itself to identify possible code snippets that could provide an indication to the primary traffic category of the website as detailed herein. Other manners of determining results from the language model may be used to determine context surrounding the search results and other aspects associated with the results.

For example, the first search result for the key phrase 'ROKU' returns the Roku homepage. Parsing through the HTML of the homepage and, in particular, key words and description would provide information about Roku that is intended to help categorize the service into one of several categories. In this case, key words such as 'Streaming', 'Media', 'Content' and the like would provide the HTML parser several matches with the Streaming category. Therefore, the system is able to recognize this type of traffic as part of the streaming category.

One approach for creating the language model involves identifying what keywords should be mapped to which category may be done using an automated method of mining common key phrases amongst known applications along with their frequency of occurrence. This can be enhanced or supplemented with human intuition. From time to time, humans may analyze popular applications or trends and determine if any new applications should be added as a key to the mapper which can bootstrap the automated collection of domain names to match to that service as and when they occur in ISP networks.

In future, once the system has gathered enough samples of meta-data and the correct mapping to specific categories of these samples, the system may be able to automate this feedback mechanism towards self-improvement using various forms of statistical learning where information is mined from traffic in the ISPs network and added to the mapper. Alternatively, a natural language model can remove the need for any human intuition.

Example of Netflix HTML response is shown in FIG. 7. This figure provides text data that the system may extract useful information from such as keywords and description and the like. The extracted information may be fed to the language module to determine further information about the traffic flow in question.

Alternatively, the HTML or the extracted meta-data would be passed to one of several language models. The language models are configured to infer traffic category and/or application from this text. For example, the English sentence for an unknown traffic flow with YuppTV sourced from Wikipedia, shown early in FIG. 6.

From the text shown in FIG. 6, the system is configured to infer that YuppTV is a streaming service. Additionally other useful information may be extracted such as region of operations, type of programming, supported devices for streaming, and the like from the description sourced from Wikipedia.

The Service/Category Recognizer module is configured to match the meta-data or extracted keywords to one of several applications or categories, at 385. Once the category is determined the traffic flow may be classified and appropriate traffic actions may be applied. The map file is intended to be updated accordingly where such traffic will no longer be considered unknown and can be matched prior to key words searches and the like. This can be periodically reviewed to ensure low false positives as this mapper can be used to train language models that will automatically be able to classify traffic.

Over time, the system is intended to configure a mapper with true labels of category, application for various server IPs or hostnames. This will allow the training of a language model using machine and/or deep learning. For example, a 1-D convolutional neural network can use the HTML source as input to the model and provide an inference which can be one of several categories and subclassification. This may be done on plain text extracted from the HTML meta-data or on the HTML source code itself.

The system may further include a Torrent module. This module may be separate from the other modules of the system in the sense that the torrent module is intended to work for torrent flows where the system has the aim of identifying the content being downloaded (or shared).

The Torrent module may use a reverse lookup tool (third party) which can identify the Title of the torrent being downloaded or a torrent application with access to the public internet that will give the system the same information. In some cases, the system may need to start a download of the file to receive the information. FIG. 8 illustrates an example of an info hash from a torrent file.

The info-hash is obtained from Peer-to-Peer (P2P) flows as part of the handshake. Once obtained, the torrent module can provide the file or title of the content being downloaded. Based on popularity, this is then appended to a mapper which can be made available for future recognition going forward. Popularity can be determined for example, based on bandwidth used in the TSP network where popularity is statistically determined in terms of bytes.

It will be understood that there are multiple techniques/technologies that can be used for modeling for textual data, for example, WordCloud, Neural Network Language Models using Word Embedding, RNN (Recurrent Neural Network), CNN (Convolutional Neural Network), and the like. The system, by using "Language Models". Is intended to encompass the techniques that come under text processing.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether the embodiments or elements thereof described herein are implemented as a software routine, hardware circuit, firmware, or a combination thereof.

Embodiments of the disclosure or elements thereof may be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for classifying traffic flows on a computer network, the method comprising:

determining sender information associated with a traffic flow;

determining WhoIs data associated with the sender information, from a WhoIs database;

determining online information associated with the WhoIs data, comprising:

searching an online search provider or online information source, not associated with the WhoIs database, with the WhoIs data;

determining the online information from text information related to a domain name and HTML meta data of search results from the online search provider;

parsing the online information for keywords, wherein a natural language model is configured to determine a frequency of keywords associated with a category of application type of the traffic flow, wherein the natural language model combines computational linguistics with machine learning;

extracting at least one known traffic signature from the traffic flow; and classifying the traffic flow as an application type based on the keywords or natural language description and the extracted traffic signature.

2. The method of claim 1 wherein parsing the online information comprises:

using a natural language model to infer the application type based on the keywords or text from the online information and a writer's intent and sentiment of the text.

3. The method of claim 1 wherein the sender information comprises at least one of IP Address, hostname or Server Name Indication (SNI).

4. The method of claim 1 wherein determining online information associated with the WhoIs data comprises querying an online WhoIs database.

5. The method of claim 1 wherein determining online information associated with the WhoIs data comprises:

creating a URL with the WhoIs data or hostname;

determining whether the created URL is an active online website; and determining online information from the website.

6. The method of claim 1 wherein the traffic flow is a torrent flow and the online information is an infohash associated with the traffic flow.

7. The method of claim 1 further comprising using the natural language module to determine URL metadata as part of the online information.

8. The method of claim 1 further comprising parsing the HTML code to provide an indication of the primary traffic category of the website.

9. The method of claim 1 further comprising using convolutional neural networks in addition to the natural language module.

10. The method of claim 1 where the keywords infer or imply a particular application category or type.

11. The system of claim 1 wherein the language module comprises convolutional neural networks.

12. A system for classifying traffic flows on a computer network, the system comprising at least one processor configured to execute instructions stored in a memory component wherein the instructions provide for modules comprising:

a WhoIs module configured to determine sender information associated with a traffic flow and determine WhoIs data associated with the sender information from a WhoIs database;

a search request and response module configured to determine online information associated with the WhoIs data, wherein determining the online information comprises:

searching an online search provider or online information source, not associated with the WhoIs database, with the WhoIs data; and determining the online information from text information related to a domain name and HTML meta data of search results from the online search provider;

a language model configured to parse the online information for keywords, wherein the language model is configured to determine a frequency of keywords associated with a category of application type of the traffic flow, wherein the natural language model combines computational linguistics with machine learning; and a Service and Category recognizer configured to extract at least one known traffic signature from the traffic flow and classify the traffic flow as an application type based on the keywords or natural language descriptions and the extracted traffic signature.

13. The system of claim 12 wherein the language model parses the online information using a natural language model to infer the application type based on the keywords from a writer's intent and sentiment of the text.

14. The system of claim 12 wherein the sender information comprises at least one of IP Address, hostname or Server Name Indication (SNI).

15. The system of claim 12 wherein the WhoIs module is configured to query an online WhoIs database.

16. The system of claim 12 further comprising a URL module configured to create a URL with the WhoIs data or hostname.

17. The system of claim 16 wherein the URL module is further configured to:

determine whether the created URL is an active online website; and determine online information from the website.

18. The system of claim 12 further comprising a torrent module configured to determine an info hash found with the traffic flow, when the traffic flow is a torrent flow.

19. The system of claim 12 wherein the language module is further configured to determine URL metadata as part of the online information.

20. The system of claim 12 wherein the language module is further configured to parse the HTML code to provide an indication of the primary traffic category of the website.

* * * * *